United States Patent
Gelblum et al.

(10) Patent No.: US 6,330,277 B1
(45) Date of Patent: Dec. 11, 2001

(54) MULTI-CHANNEL PARALLEL/SERIAL CONCATENATED CONVOLUTIONAL CODES AND TRELLIS CODED MODULATION ENCODER/DECODER

(75) Inventors: Ehud Alexander Gelblum, New York, NY (US); Hamid R. Sadjadpour, Randolph, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/861,625

(22) Filed: May 22, 2001

Related U.S. Application Data

(62) Division of application No. 09/572,857, filed on May 18, 2000, which is a division of application No. 09/001,342, filed on Dec. 31, 1997, now Pat. No. 6,088,387.

(51) Int. Cl.[7] ................ H04B 1/38; H04L 5/16
(52) U.S. Cl. ............ 375/222; 714/755; 714/758; 375/265
(58) Field of Search .................. 375/222, 265, 375/253, 267; 713/800, 755, 758, 281, 786, 6

(56) References Cited

U.S. PATENT DOCUMENTS

| | | |
|---|---|---|
| 5,446,747 | 8/1995 | Berrou . |
| 5,563,897 | 10/1996 | Pyndiah et al. . |
| 5,996,104 * | 11/1999 | Herzberg ............... 714/755 |
| 6,078,626 * | 6/2000 | Ramesh ............... 375/262 |
| 6,088,387 * | 7/2000 | Gelblum et al. ........ 375/222 |
| 6,266,795 * | 7/2001 | Wei ................... 714/755 |
| 6,275,538 * | 8/2001 | Ramesh et al. ........ 375/265 |

* cited by examiner

Primary Examiner—Mohammad H. Ghayour
(74) Attorney, Agent, or Firm—Banner & Witcoff, Ltd.

(57) ABSTRACT

A method and apparatus to transmit turbo-encoded data in a multitone channel assigns the original data and selected parity bits across multitone subchannels allowing transmission of an entire turbo-encoded block withing one or few symbol time frame. Parity bits are selected by a procedure using data derived by optimization using simulation of a single-channel system The optimization determines, for a specified bit error rate, for each possible number of information bits per symbol, the code rate corresponding to the lowest signal-to-noise ratio. Alternatively, in the simulation non-identical integer values may be applied to the channels to approximate non-integer values of code rate and information bits-per-channel in the aggregate. The optimized data are used to determine an optimal code rate and SNR for each channel. In assigning the respective bits to the channels, the number of parity bits in each channel are shared.

5 Claims, 5 Drawing Sheets

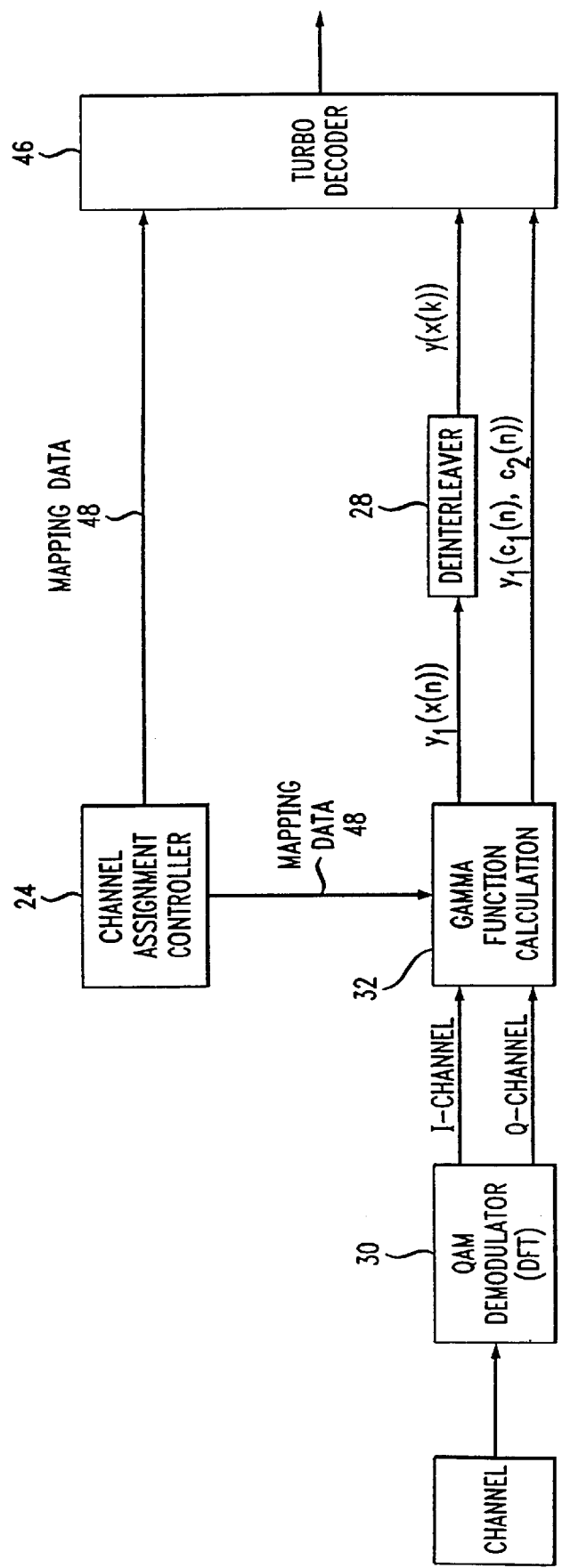

MULTI-CHANNEL PARALLEL/SERIAL CONCATENATED CONVOLUTIONAL CODES AND TRELLIS CODED MODULATION ENCODER/DECODER

This application is a divisional of U.S. patent application Ser. No. 09/572,857, filed May 18, 2000, which is a divisional of Ser. No. 09/001,342, filed Dec. 31, 1997 now U.S. Pat. No. 6,088,387, by the same inventors and similarly titled.

FIELD OF THE INVENTION

The invention relates to turbo code (Parallel or Serial Concatenated Convolutional codes). More specifically, the invention relates to the combination of turbo code with trellis coded modulation (TCM) techniques within a multi-tone modulation environment.

BACKGROUND OF THE INVENTION

Several techniques for combining turbo code with trellis code modulation (TCM) are described in the current literature. The combination is attractive because it allows high spectral efficiency in the encoder/decoder to be combined with high coding gain. In all of the prior art approaches (see references 1 through 4), the main concern is achieving low bit error rate (BER) performance at the lowest signal-to-noise ratio (SNR) possible, while obtaining high spectral efficiency. The codes described in the prior art are designed for a fixed modulation system. For example, the codes are designed for M-Quadrature Amplitude modulation (MAM) or M-Phase Shift Keying (M-PSK), where M, the dimension of the constellation, is constant for the application.

Turbo code achieves very impressive bit error rate (PER) performance. However, turbo code exacts a price in terms of computational complexity and block size in exchange for such low BER. These problems are compounded when viewed from the standpoint of multichannel tansmission systems. In multichannel or multicarrier systems, the number of bits that can be transmitted in a single symbol time in each channel is very small compared to the size of a turbo block. However, in order to decode turbo-encoded data, the entire block must be received at the modem. This is because all of the parity bits relate to all of the information bits. This means that the receiver must wait many symbol times in order to decode a single bit of data. For example, in QAM modulation in a multicarrier system, such as digital subscriber line (DSL) modems, where total power for all sub-bands is limited and a power spectral density (PSD) mask applies, QAM constellation sizes may be limited to something like 10 bits per channel. A typical turbo block size is of the order of 1000 bits plus the parity bits. The receiver would have to wait 150 symbol times (assuming a ⅔ code rate) and queue up a lot of data before it could decode.

In addition to the long delay for transmitting large turbo blocks, the prior art techniques, do not address the multi-tone modulation environments. In multi tone communications, multiple channels, each identified with a separate frequency carrier, are employed to transmit data. In a multi tone system, the channel characteristics vary from channel to channel and advantages are achieved by allowing the constellation sizes to vary from channel to channel; hence the name which is short for multiple tones. For example, determining how many parity bits to send is based on selecting a code rate that provides the highest possible information bit rate. The code rate, however, is a single parameter that must be traded against constellation size and signal-to-noise ratio (SNR). But in a multi tone environment, these are allowed to vary from channel to channel.

Since the filing of our prior U.S. patent applications Ser. Nos. 09/573,857, filed May 18, 2000, and 09/001,342, filed Dec. 31, 1997, we have learned of two further prior art references, U.S. Pat. Nos. 5,446,747 and 5,563,897 which relate to Turbo code. The above-identified parent applications and the '747 and '897 patents should be deemed incorporated by reference herein as to their entire contents. The '747 patent describes two codings in parallel and the '897 patent is directed to detecting information bits processed by the codes.

SUMMARY OF THE INVENTION

An object of the invention is to provide an apparatus for implementing turbo code and trellis code modulation in a multi tone communications environment.

Another object of the invention is to provide an improved method for calculating turbo code parameters.

Still another object of the invention is to provide an improved method for coding and decoding turbo coded data bits.

Briefly, a method and apparatus to transmit turbo-encoded data in a multitone channel assigns the original data and selected parity bits across subchannels allowing transmission of an entire turbo-encoded block within one or few symbol time frames. Parity bits are selected by a procedure using data derived by optimization using simulation of a single channel system. The optimization determines, for a specified bit error rate, for each possible number of information bits per symbol, the code rate and constellation size corresponding to the lowest signal-to-noise ratio. Alternatively, in the simulation non-identical integer values may be applied to the channels to approximate non-integer values of code rate and information bits-per-channel in the aggregate. The optimized data are used to determine an optimal code rate, constellation size, and SNR for each channel. In assigning the respective bits to the channels, the number of parity bits in each channel are shared.

To eliminate the processing delay associated with transmitting large turbo blocks, this patent application proposes spreading a single turbo block across multiple channels. So, for example, if there are 512 channels in a multicarrier system and each channel carry 2 bits per symbol, the receiver can receive an entire turbo block plus parity bits in a couple of symbol times. In turbo code, the code rate and the constellation size can be varied selectively based on the channel characteristic. For example, turbo code produces at least two parity bits for each information bit. However, it is rare that the highest throughput is obtained by sending all the parity bits (the lowest code rate). The overhead is too high (that is, the code rate or ratio of information bits to total bits is too low) for the benefit of having so many parity bits. Thus, in using turbo codes, transmitters remove parity bits in a process of puncturing. Given a channel attenuation and noise level, one can find by simulation, the optimum number of parity bits to transmit and the optimum constellation size for the given power constraints. That is, constellation size is traded against signal-to-noise ratio and code rate for a fixed bit error rate and channel characteristic (attenuation and noise and whatever other characteristics may be folded into the channel model used for simulation) to optimize the number of information bits transmitted at the given BER.

The present invention applies a combination of turbo code and trellis code modulation (TCM) in a multi-tone modulation system. For example, the invention is applicable to a multi tone system employing M-quadrature amplitude modulation (M-QAM) or M-phase shift keying (M-PSK), where M, the dimension of the constellation, can vary from one channel to another channel. The turbo code trellis code modulation (TTCM) design of the invention, is based on the fact that the size of the constellation for each channel varies from channel to channel. The invention permits the use of a single TTCM encoder in the transmitter and a single TTCM decoder in the receiver. This feature reduces delay compared to prior art devices that employ separate individual encoders and decoders for each channel. The feature also reduces the complexity of the transmitter and receiver.

Another significant difference between the technique used in the invention and prior art techniques is the fact that bits are never estimated from the symbols. According to the invention, the received symbols are used to compute the parameters of the turbo code directly. In addition, in this regard, this technique is more efficient in terms of computational complexity. More specifically, combining log of the likelihood ratio approach and this technique makes computation of turbo code parameters very simple.

The invention can be used in systems where there are many available channels to transmit the information from one transmitter to one receiver. In such systems, instead of having multiple encoders and decoders at the transmitter and receiver to service all the channels, there will only be a single encoder that applies the turbo code trellis coded modulation to the channels and a single decoder to decode the information that is sent throughout the various channels. Any modulation scheme such as QAM or PSK can be used for this invention and the size of the constellation across all available channels can be different from each other. A similar technique can be used when we transmit the data over one channel, but the channel is divided into many frequency sub-bands and each one of these sub-bands is treated as a unique channel.

The current invention will only require one encoder for delivery of information over environment with multiple channels and decoding of the received encoded data with only one decoder at the receiver. The same advantages accrue where the channel is divided into many frequency sub-bands and each sub-band is treated as a separate channel.

DETAILED DESCRIPTION OF THE PREFERRED EMBODIMENTS

Figure 1:
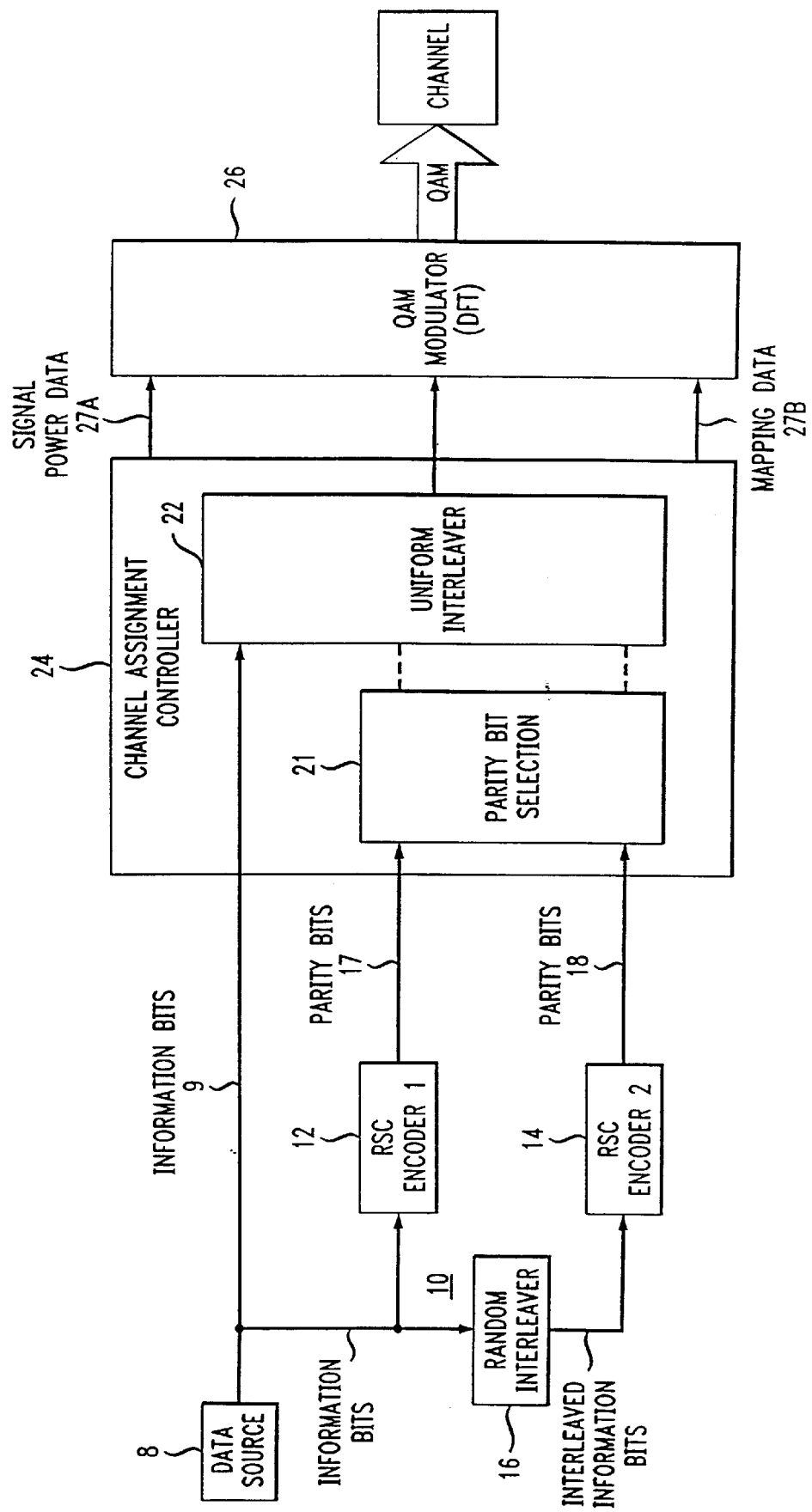
FIG. 1 shows a transmitting portion of a multitone modem according to an embodiment of the invention.
Figure 1A:
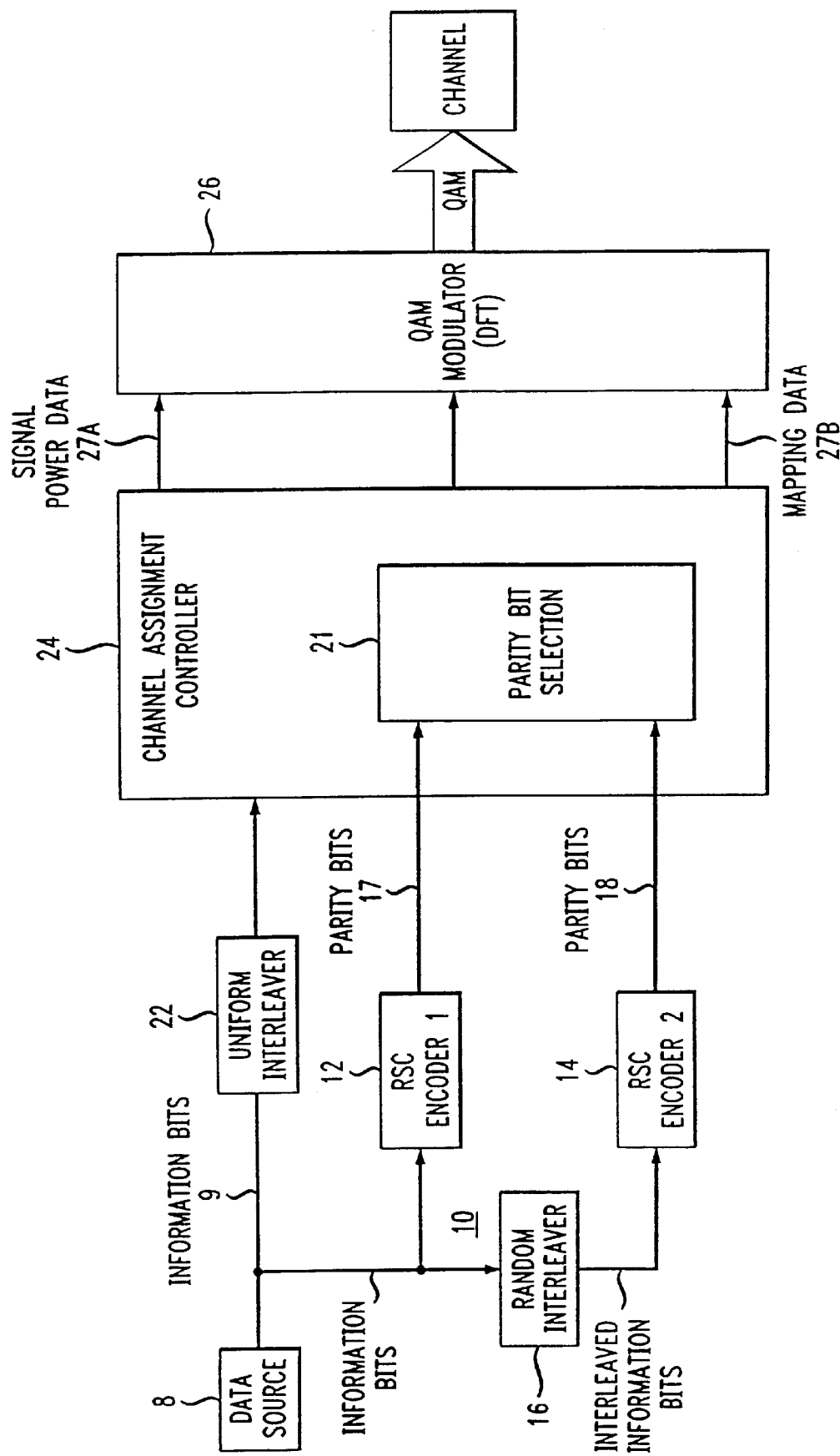

Referring to FIG. 1, an encoder 10 of a turbo-trellis code modulation (TTCM) system has first and second recursive systematic convolutional encoders (RSC encoders) 12 and 14. First RSC encoder 12 receives information bits from a data source 8 and generates a first stream of parity bits 17, one for each information bit from data source 8. Second RSC encoder 14 receives information bits from data source 8 through a random interleaver 16 and generates a second stream of parity bits 18, one for each information bit from data source 8. First and second RSC encoders 12 and 14 together with random interleaver 16 comprise a turbo encoder. Encoder types other than RSC encoders may be used in a turbo encoder, but, for purposes of the present invention, RSC encoders are preferred. In addition, these RSC encoders can be concatenated in series. Also, more than two RSC (or other type) encoders may be used in a turbo encoder, each receiving information through an interleaver. In the preferred embodiment, however, one such interleaver is used. Information bit stream 9 (data directly from data source 8) and parity bit streams 17 and 18 are applied to a channel assignment controller 24. In channel assignment controller 24, parity bits are selected from the parity bit streams 17 and 18 by a parity bit selection portion 21. The selected parity bits and information bit stream 9 are then interleaved by a second interleaver 22. The second interleaver can actually include two interleavers. If two interleavers are used, one interleaver is for information bits and the second one is for parity bits. Second interleavers can be either random or uniform interleavers. In this application uniform interleavers are preferred. The interleaved bits from uniform interleaver 22 are applied to a QAM modulator 26. Channel assignment controller 24 sends signal power data 27A to QAM modulator 26 to control the power level of the respective QAM tones generated by it. Also, Channel assignment controller 24 sends mapping data 27B to QAM modulator 26 to assign each bit in the interleaved data stream to respective coordinates in the respective QAM tones generated by QAM modulator 26. QAM modulator outputs QAM tones to a channel. The details of how channel assignment controller 24 performs the tasks identified above are discussed below. Note that QAM modulator 26 could be replaced by a phase shift keying (PSK) modulator or any other modulation method could also be used.

Channel assignment controller 24 performs the selection and direction of information and parity bits according a specific set of rules that uniquely determines the constellation size for each channel and which information and parity bits are assigned to each QAM coordinate. In addition, channel assignment controller 24 also directs the power level for each QAM tone generated in each channel by QAM modulator 26. These features of channel assignment controller 24 are described below.

Figure 3:
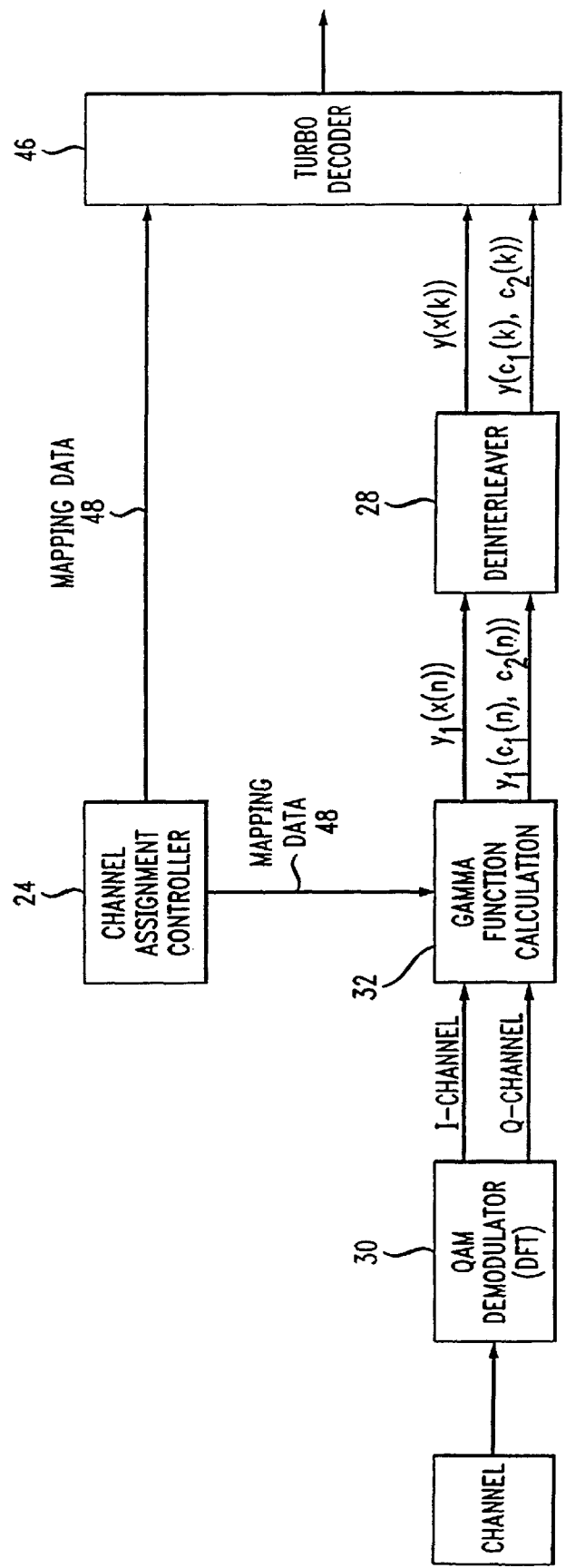
FIG. 3 shows a receiving portion of a multitone modem according to an embodiment of the invention.

Referring to FIG. 1, QAM tones generated by QAM modulator 26 are applied to a single physical channel with multiple frequency channels. The respective QAM tones are received by a QAM demodulator 30 shown in FIG. 3. QAM demodulator 30 separates the I And Q channel data for each QAM tone. These are applied to a gamma function processor 32 which calculates a gamma function from the I and Q channel data. Gamma function data represent a first order probability of both the information bits and the parity bits and is derived based on the channel characteristics and mapping of the information bits and parity bits into a QAM signal. The gamma probabilities are calculated in real time as the I and Q channel data are sequentially generated from the multi tone signal. The gamma probabilities are applied to a uniform deinterleaver 28 which reverses the interleaving performed by uniform interleaver 22. The data resulting from the latter deinterleaving process represents, probabilistically, the original (punctured) parity bit stream and the original information bit stream in the order in which it was delivered from the turbo-encoder prior to uniform interleaving. For the gamma functions to be calculated properly in the first instance by gamma function processor 32, gamma function processor 32 must receive mapping data 44 which gives constellation size and bit assignments (i.e, which bits are encoded by the respective QAM tones for each channel). This information is provided by channel assignment controller 24 in the receiving modes. Since information derived during initialization is provided to both modems and since the assignment of data from turbo encoder 10 is uniquely determined by rules programmed into channel assignment controller 24, channel assignment controller 24 is capable of providing control information to gamma function processor 32 required to calculate correct gamma probabilities from the I and Q channel data. The deinterleaved data are fed to a turbo decoder 46 for iterative decoding using an appropriate turbo-decoding process, such as described in the literature.

The number of bits (m) transmitted in each channel depends on the power of noise, the channel attenuation, PSD mask limit and any other characteristics of that particular channel that may vary with frequency. The number of bits, including both information and parity bits, corresponds to the constellation size of an M-QAM or M-PSK symbol. If there are m bits to be represented by a QAM or PSK tone, there must be $M=2^m$ different distinguishable QAM or PSK symbols and the constellation size is said to be M. During the initialization procedure a pseudo-random signal is transmitted at one end of the channel and received at the other end to measure the channel transform characteristic. The transform characteristic is used to determine the respective constellation size for each channel using the channel data stored as a table showing the channels and corresponding parameter(s), for example, the noise power-gain ratio, for each channel.

The size of random interleaver 16 corresponds to the size of the block that is chosen for the turbo code in the particular application. Uniform interleaver 22 can be smaller than the first interleaver. The size of uniform interleaver 22 should consider factors such as the duration of the impulsive noise in the channel, or, if there is a fading channel, its size is based on the maximum duration of the fade in all the channels. In general, it is possible to interleave only the information bits in uniform interleaver 22 without interleaving the parity bits together with the information bits.

Figure 2:
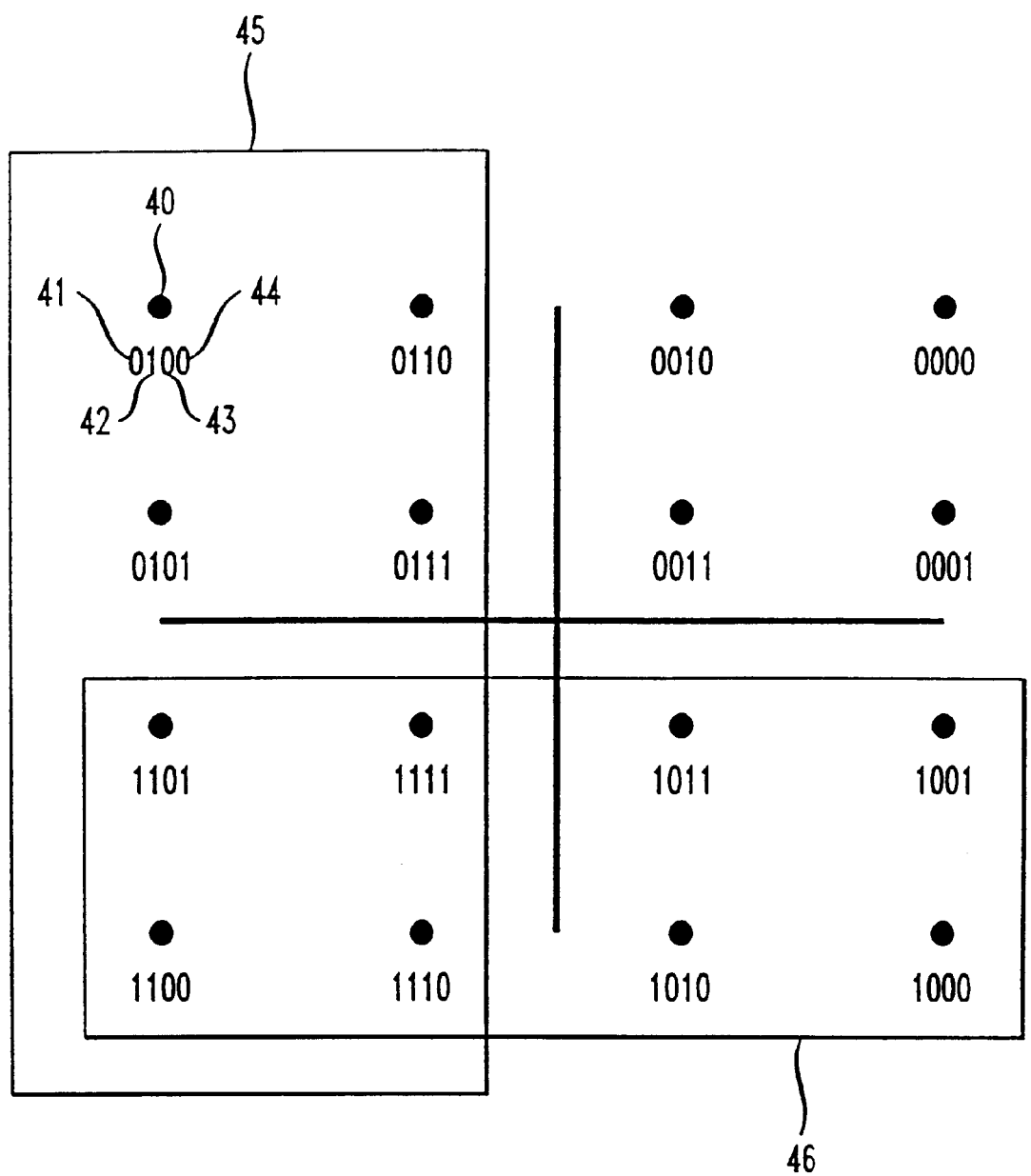
FIG. 2 shows a mapping scheme for a 16-QAM constellation.

Referring to FIG. 2, the assignment of bits to the (e.g., M-QAM) symbols can employ any suitable mapping scheme such as Gray mapping, natural mapping, or reordered mapping. One of the rules by which channel assignment controller 24 controls the mapping of bit sequences to symbol coordinates involves the concept of a most-protected bit. In FIG. 2, a 16-QAM signal mapping is shown. As mentioned, a 16-QAM signal can represent 4 bits and each coordinate shown in the figure represents a possible value for a 4-bit word represented by the QAM signal. Of the four bits 41 through 44, the two most significant bits 41 and 42 are most protected. As can be seen in FIG. 2, most significant bit 41 has the value of one for all points in an envelope 46 (and consequently it has the value of zero for all the other points). Similarly, the second most significant bit 42 has the value of one for all points in envelope 45 (and consequently it has the value of zero for all the other points). These bits are the most protected because the likelihood is that the largest degree of distortion in the QAM tone is required for one of these bits to be incorrectly represented. Note that for second most significant bit 42 to be misrepresented, there must be distortion in the I channel signal. For most significant 41 to be misrepresented, there must be distortion in the Q channel. For many mapping schemes, some bits will have this property of being less likely for a given level of distortion to be misrepresented in the final distorted signal. For QAM and PSK and other kinds of symbols, there will be two most protected bits, one corresponding to the I channel and one corresponding to the Q channel.

In assigning bits to the various symbols, channel assignment controller 24 adheres to a number of rules. A first rule according to which channel assignment controller 24 assigns bits governs the selection of parity bits to preserve and transmit (the others being rejected). As mentioned above, the number of parity bits created by the turbo-encoder is far more than is justified to transmit. The benefit of transmitting a large number of bits for error-correction is offset by the consequent reduction in the total number of information bits since the communication system is only capable, to an approximation, transmitting a certain total number of bits (information bits plus parity bits) per unit time for a given total transmit power. The optimal number of parity bits depends on the channel characteristics and limits on power. Optimal code rates of more than ½ and higher are typical. Therefore, in most cases, many parity bits are simply not transmitted. The number of parity bits transmitted should therefore be optimized based on the channel characteristics.

In a network comprising multiple identical channels, the code rate can be optimized by simulation. The goal of the optimization is to determine, for a given BER and a given number of information bits, the combination of the total number of bits and the total number of parity bits that corresponds to the lowest total SNR An AWGN (or other type of) channel can be simulated numerically (or a real-world simulation using a pseudo-noise signal in a real channel could be done). Since there is a single constellation size in this situation, the code rate can be traded against signal power and constellation size to arrive at an optimum code rate for a predefined BER. In the multi tone environment, the constellation size may vary across many channels. To simulate every possible spectrum of channel characteristics would be impractical. Moreover, the amount of memory required to store results of such an optimization, to permit implementation, would also be impractical and undesirably expensive.

It has been found through simulation that optimization results from a single-channel network can be extended to channels with variable channel characteristics according to a procedure which is now described. Near-optimum performance in the multi tone environment can be obtained by optimizing the constellation size, code rate (i.e., number of parity bits), and SNR for a single channel whose bandwidth corresponds to the bandwidth of the channels in a multi tone network. A simulation model that calculates SNR given a required minimum BER, constellation size, number of parity bits (i.e., code rate) is used to determine, for a given BER and number of information bits, the combination of total number of bits and parity bits that correspond to the lowest SNR. The result will be a table which specifies, for each value of information bits per channel, an optimal value of SNR, constellation size, and parity bits per channel (the latter could be specified as code rate).

Note that to perform the above optimization, a driving program, such as available from math libraries, can be used to alter the various parameters in a way that locates the optimized points with as few simulations as possible. For each number of information bits per channel, an optimal combination of constellation size, SNR, and number of parity bits is found. The optimization data is stored in a table (called the optimized rate table or ORT) and used by channel assignment controller 24 to direct the assignment of bits to the various symbol coordinates for each channel. The results of the single-channel optimization are used to optimize the code rate in the multi tone environment as described below.

In the ORT, each row corresponds to one of the possible number of information bits and the corresponding optimum SNR and code rate (the constellation size being determined by the number of information bits and the code rate). Channel assignment controller 24 assigns bits to each channel in turn using the ORT data and the channel characteristic data measured during the initialization procedure. Channels are preferably sorted by a channel characteristic parameter, such as the difference between PSD mask limit and the ratio of gain to noise power, and assigned bits sequentially through the resulting series. The first step in assigning bits for a particular channel is to determine the total number of bits to be transmitted in the channel and the number of those bits that will be parity bits. This is determined by first assigning a constellation size and number of parity bits for each channel. Working in descending order by number of information bits the SNR data in the ORT is compared to the channel characteristic and any PSD mask limit that applies to the given channel. If the required power exceeds the limit, the next lower number of information bits is checked until the total power required falls below the mask limit. This provides a constellation size, code rate, and SNR for the channel.

An alternative procedure for generating the ORT and implementing channel assignment may be used to obtain a finer degree of resolution in the independent parameters. Consider what happens when a simulation determining the optimum number of party bits per channel is based on a single channel (or viewed as an optimum for each channel alone). This forces one to select the total number of parity bits to be transmitted, when speaking of multiple channels, from integral multiples of the number of channels. Suppose there are 256 channels and the turbo block as 1024 bits in it. Suppose further that 128 of the channels have very similar transfer characteristics. If a single channel model is used to determine the optimum for these 128 channels, the optimum number of parity bits for the entire turbo block as a whole must be selected from among multiples of 128 bits. The modem can send 1 parity bit per channel or 2 parity bits per channel, etc. For these 128 channels, the code rate is varying by huge degrees with each change in the number of parity bits. It must be varied in chunks of 128 bits. For just this group of channels, that corresponds to a step size in code rate of 0.125. The number of information or parity bits per channel may be permitted to vary from channel to channel, even though they have nearly identical transfer characteristic (identical for the simulation and nearly identical for the practical situation). Thus, consider a group of five channels and ask, for a given number of total information bits in these five channels, what is the total number of parity bits (or code rate) and constellation size that corresponds to the lowest signal to noise ratio? The optimum might pack a total of 8 parity bits in the five channels, which corresponds to some channels carrying a parity bit and some channels carrying no parity bit. For example, consider 3.33 information bits per channel and a total of 4 bits per channel. The bits could be loaded for the simulation as follows:

| Channel | Information | Parity | Total |
|---|---|---|---|
| 1 | 3 | 1 | 4 |
| 2 | 3 | 1 | 4 |
| 3 | 3 | 1 | 4 |
| 4 | 4 | 0 | 4 |
| 5 | 3 | 1 | 4 |

-continued

| Channel | Information | Parity | Total |
|---|---|---|---|
| 6 | 3 | 1 | 4 |
| 7 | 4 | 0 | 4 |
| 8 | 3 | 1 | 4 |
| 9 | 3 | 1 | 4 |
| 10 | 4 | 0 | 4 |
| 11 | 3 | 1 | 4 |
| 12 | 3 | 1 | 4 |
| 13 | 3 | 1 | 4 |
| 14 | 4 | 0 | 4 |
| 15 | 3 | 1 | 4 |
| 16 | 3 | 1 | 4 |
| 17 | 4 | 0 | 4 |
| 18 | 3 | 1 | 4 |

Since each channel can carry only an integral number of parity bits and information bits, to vary total code rate (summed over all channels) the number of party bits must be varied from channel to channel. A scheduling formula to allocate parity bits for purposes of simulation among the channels may take the form (although other scheduling formulas are possible):

$$p_i = INT\left[\sum_{j=1}^{i} P_j - \sum_{k=1}^{i-1} p_k\right] = INT\left[\left(\sum_{j=1}^{i-1} P_j - p_j\right) + P_i\right] \quad (1)$$

where $p_i$ is the number of parity bits in the ith channel, and $P_i$ is the non-integer value of the number of parity bits per channel for the ith channel. For purposes of simulation, the values $P_i$ are the same for all channels (The same equation is used to assign integer values to the multi tone channels and in that case, the value of $P_i$ varies from channel to channel). The above equation will produce a series of integers that approach, on average, the non-integral values for a large number of channels.

The following procedure may be used to perform the simulation. Instead of simulating a single channel and optimng the single channel, a number of identical channels are simulated, that is, they all have the same frequency characteristic. This optimization would produce exactly the same result as a single channel if each channel were required to carry the exact same number of information bits and parity bits. However, in this case, the number of parity bits and information bits are allowed to vary from channel to channel. So, considering a set of channels, the optimization does not seek to determine, for a specified bit error rate, for each possible number of information bits per symbol, the code rate and constellation size corresponding to the lowest signal-to-noise ratio. Instead, the optimization looks at the channels as a group and asks a similar question. It could be, for a given number of information bits per channel (not necessarily integer) what is the constellation size that corresponds to the lowest signal to noise ratio? That is, the channels are viewed as a group, rather than optimized individually. Thus, for example, to simulate 3.5 information bits per channel, the constellation size may be stepped through a range of sizes from 4 to, say, 8, the constellation size being the same for all the channels for each simulation run. Every other channel would have three information bits and the rest would have 4 information bits. For a constellation size of 4 the number of parity bits would alternate between 0 and 1 in adjacent channels so that the average number was 4−3.5 or 0.5 parity bits per channel. The rest of the constellation sizes would be simulated and the result would be a table as discussed above, except that non-integer values of parity bits per channel or information bits per channel would be allowed.

Equation (1) above applies to the situation where the channel characteristic of all frequency channels is identical. To apply non-integer code rates and/or information bits per channel to each channel in a process similar to that defined by equation (1) except that the values of the value of $P_i$ varies from channel to channel. To make the assignment of bits to the channels approach the situation simulated, where adjacent channels had identical characteristics, in performing the bit allocation, the frequency bins may be sorted by some channel characteristic so that the optimal parameters vary slowly and smoothly as bits are assigned in sequence. Thus, for example, in assigning bits, an adjacent series of channels would tend to be similar enough to have the same optimal number of information bits per channel allocated to them. As the bits are assigned, a sequence equal to the non-integer loading factor would be maintained in applying equation (1). If the number of bits per channel is allowed to vary abruptly, the assignment of bits would not relate well to the simulation that determined the optimal values.

Once parity and information bits are assigned to all the bins, if the aggregate power required to transmit all the bits in all the channels exceeds any applicable frequency-aggregate power limit, bits can be removed from the bins. Preferably, to meet the aggregate power limit, information bits are removed from the bins by determining the step in the ORT toward lower SNR corresponding to the greatest reduction in signal power in exchange for the least amount of information change. This can be done using the ORT in a procedure described in U.S. Patent Application entitled Method and Apparatus for Allocating Data for Transmission Via Discrete Multiple Tones-Sonalkar, et. al, the entirety of which is incorporated herein by reference. The only modification to the procedure described in the above application is that, instead of removing bits per se, the procedure uses the ORT table to determine the power required to transmit data rather than a formula. In this modified procedure, the algorithm would step through the column of SNRs to fill up the bins to the PSD mask limit. Then, to satisfy the aggregate power limit, if necessary, the procedure would go through the ORT to determine the incremental change in constellation/SNR assigmnent for a channel that would reduce the aggregate power the most for the smallest change in total inforrmation bits transmitted. In essence, the energy calculation function described in that reference is replaced by the SNR determined by the ORT.

Although in the preferred embodiment described above, the optimized rate table (ORT) is derived using a single-channel model, other possible optimization methods are possible. An alternative optimization method which can be used to generate the ORT data is to optimize the total number of information bits transmitted for a series of representative profiles of channel characteristic with frequency. These results would provide an optimal code rate for the entire series of channels. A best fit between the representative frequency profiles and the measured profile obtained during initialization would indicate the code rate for the transmission. Then, using the code rate, each channel could contribute to the transmission of parity bits on a pro rata basis according to constellation size determined by a conventional bit-loading algorithm used in multi tone systems.

Exactly which parity bits are preserved by transmission with the information bits and which are rejected is determined by another set of rules. In addition, the assignment of the respective bits to the respective symbol coordinates is based on still other rules. These rules are described below.

To determine which of the parity bits to allocate for transmission, channel assignment controller 24 selects parity bits originating from among the multiple RSCs such that, on average, each RSC encoder will contribute an equal the number of parity bits to the total transmitted over all channels for a given block. In addition, the parity bits are assigned in such a way as to distribute parity bits from each RSC encoder as uniformly across the spectrum as possible. This is done by allocating parity bits sequentially and alternating among the RSCs.

Another rule followed by channel assignment controller 24 relates to the assignment of information and parity bits to specific symbol coordinates. If there is one parity bit to be represented in a channel, the parity bit is assigned to one of the most protected bits. To insure that the assignment is unique, the I-channel most protected bit can be preferred or the controller can alternate between the I-channel most protected bit and the Q-channel most protected bit. If there are two parity bits to be conveyed in a channel, the parity bits are split between the I-channel most protected bit and the Q-channel most protected bit. If there are three parity bits to be assigned, the first and second most protected bits will be assigned. It would be rare for there to be more than 2 parity bits in a 16-QAM constellation as code rates for turbo-coded signals are usually higher than ½. Where no $n^{th}$-most protected bit can be identified, some rule that makes the choice for assigning any remaining parity bits can be chosen as long as it is unambiguous and uniquely determines the assignment of the parity bits.

When the end of a turbo block is reached, the controller treats any remaining space available in the current bin as a new channel and continues the allocation procedure beginning with the first channel in the next symbol period (as if it were wrapped around to the current symbol period). When the last channel is allocated in a symbol period, the symbols are generated.

Receiver 2 and the transmitter 1 both either have the information about the symbol constellation sizes a priori or they share the information during a startup or refresh period. Since both the receiver and the transmitter both have the same information, by applying the procedures and rules discussed above, their respective channel assignment controllers 24 can independently determine which bits are assigned to the various symbol coordinates.

The invention employs a unique decoding process. To explain this in detail, it is necessary to define some of the parameters of the turbo code. Each symbol (for example if a QAM symbol is used) may be represented as a complex number at the output of TTCM encoder 10. This complex number, $A_k+jB_k$, is transmitted through the channel and at the receiver, additive noise in the channel is combined with the original signal to produce a new signal represented by the following equations for the I and Q channels:

$$I_k = A_k + n_i \qquad (2)$$

$$Q_k = B_k + n_q \qquad (3)$$

where $n_j$, and $n_q$ are additive noise components, in general not necessarily Gaussian noise. In prior art systems, the symbols are first soft-decision decoded by computing the Logarithm of Likelihood Ratio (LLR). The soft-decoded data are applied to an input to a turbo decoder. The LLR is computed as follows:

$$\lambda(x(k)) = K \text{Log} \left[ \frac{Pr\{x(k)) = 1/I_k, Q_k\}}{Pr\{x(k)) = 0/I_k, Q_k\}} \right], \quad i = 1, \ldots, m-m' \quad (4)$$

where K is a constant, x(k) is the actual value of the information bit transmitted. Decoding of parity bits is performed by the same equation, replacing x(k) in (4) by $c_i(k)$ where I=1,2, ... L−1, where (L−1) is the total number of RSC encoders. In some papers, a simplified version of equation (4) is suggested. In our approach, we utilize the I and Q channel data, $I_k$ and $Q_b$, directly to calculate the parameters of the turbo code. Before explaining this procedure, it is necessary to describe the decoding procedure in the turbo code briefly.

Assume that the turbo encoder is based on the parallel concatenation of RSC encoders (the RSC encoders can also be concatenated in series) and that the length of the shift register in each RSC encoder is n. In general, the number of shift registers for each RSC encoder can be different. For the case where the number of shift registers, n, is the same for all of the RSC encoders, there will be $2^n=N$ different states for each one of the RSC encoders. The LLR estimate of each decoded bit can be written based on the a-posteriori probability (APP) of that bit.

$$\lambda(x(k)) = K \text{Log} \left[ \frac{Pr\{x(k)) = 1/\text{observation}\}}{Pr\{x(k)) = 0/\text{observation}\}} \right] \quad (5)$$

The state of encoder 10 at time k is defined as $S_k$ and the sequence of data (observation) is defined as $R_1^K = \{R_1, \ldots R_K\}$. Each observation datum is defined as $R_K = \{x(k), ci(k)\}$ where x(k) and $c_i(k)$ represent the received information bit and the parity bit of the I-th encoder at time k respectively after noise is added to the signal. The parity bit may not be available for some of the observation data. The number of RSC encoders is assumed to be 2, in this example. The block length of the data sequence is K bits. The APP of a decoded bit x(k) can be written as:

$$Pr\{x(k)=i/R_1^K\} = \Sigma \psi_k^i(N), \quad i=0,1 \quad (6)$$

where $\psi_k^i(N)$ is defined as:

$$\psi_k^i(N) = Pr\{x(k)=i, S_k=N/R_1^k\}. \quad (7)$$

From (6) and (7), (5) can be written as follows:

$$\lambda_1 = \text{Log} \frac{\sum_N \psi_k^1(N)}{\sum_N \psi_k^0(N)} \quad (8)$$

$\psi_k^1(N)$ in (8) can be written in terms of three parameters. These parameters are defined as:

$$\alpha_k(N) = Pr\{S_k = N/R_1^k\} \quad (9)$$

$$= h_\alpha \sum_{NI} \sum_{i=0}^{1} \gamma_i(R_k, NI, N) \alpha_{k-1}(NI)$$

$$\beta_k(N) = \frac{Pr\{R_{k+1}^K/S_k = N\}}{Pr\{R_{k+1}^K/R_1^K\}} \quad (10)$$

$$= h_\beta \sum_{NI} \sum_{i=0}^{1} \gamma_i(R_{k+1}, NI, N) \beta_{k-1}(NI)$$

$$\gamma_i(R_k, N1, N) = Pr\{x(k)=i, S_k=N, R_k/S_{k-1}=N\} \quad (11)$$

$$\gamma_i(R_k, N1, N) = Pr\{R_k/x(k)=i, S_k=N, S_{k-1}=N1\} \cdot Pr\{x(k)=i/S_k=N, S_{k-1}=N1\} \cdot Pr\{S_k=N/S_{k-1}=1\} \quad (12)$$

where $h_{60}$ and $h_{62}$ are the normalization factors. $\psi_k^i(N)$ can then be written as:

$$\psi_k^i(N) = \sum_{NI} \gamma_i(R_k, NI, N) \cdot \alpha_{k-1}(NI) \cdot \beta_k(N), \quad i = 0, 1 \quad (13)$$

Then (8) can be re-written using (13).

$$\gamma_1(x(k)) = \text{Log} \frac{\sum_N \sum_{NI} \gamma_i(R_k, NI, N) \cdot \alpha_{k-1}(NI) \cdot \beta_k(N)}{\sum_N \sum_{NI} \gamma_0(R_k, NI, N) \cdot \alpha_{k-1}(NI) \cdot \beta_k(N)} \quad (14)$$

In an Additive White Gaussian Noise (AWGN) channel the first factor in the right hand side of equation (12), $Pr\{R_k/ \ldots \}$, is the transition probability of the discrete Gaussian memoryless channel. Equation (12) can be determined from transition probabilities of the discrete memoryless channel and transition probabilities of the encoder trellis. Assuming the condition (x(k)=I, $S_k$=N, $S_{k-1}$=NI), $R_k$ consists of two uncorrelated Gaussian variables, namely x(k) and ci(k), and thus we can write it as the product of two probabilities:

$$Pr\{R_k/x(k)=i, S_k=N, s_{k-1}=N\}=Pr\{x_r(k)/ \ldots \} \cdot Pr\{ci_{r,i}(k)/ \ldots \} \quad (15)$$

In many applications, the x(k) and ci(k) are softly estimated by calculating LLR using equation (4) or a simplified version of (4). Then, the result will be used to find the conditional probabilities defined in (15). However, since the receiver is aware of the constellation of the signals, the symbols can be used directly to compute the probabilities in (15).

$$Pr\{x_r(k)/x(k)=i,S_k=N,S_{k-1}=N1\}=Pr\{Ik,Qk/ \ldots \}$$

$$Pr\{c_{r,i}(k)/x(k)=i,S_k=N,S_{k-1}=N1\}=Pr\{Ik,Qk/ \ldots \} \quad (16)$$

Equation (16) is used to compute the gamma function (the first parameter in the right hand side of (12)). This approach reduces the computational complexity of the system without degrading the performance of the system. After computing the gamma function, the alpha and beta functions can be computed according to equations (10) and (11). If this approach is combined with logarithm of the likelihood ratio approach in which the logaritm of the turbo parameters are calculated, then for an AWGN channel calculation of the gamma function will be substantially simplified.

The respective entireties of the following publications are incorporated herein by reference.

[1] Stephane Le Goff, Alain Glvieux, and Claude Berrou, "Turbo-Codes and High Spectral Efficiency modulation" Proceedings of ICC'94, New Orleans, La., May 1994.

[2] Patrick Robertson and Thomas Worz, "A novel bandwidth efficient coding scheme employing turbo-codes", Proceedings of ICC'96, Dallas, Tex., June 1996.

[3] Sergio Benedetto, Dariush Divsalar, Guido Montorsi, and Fabrizio Pollara, "Parallel concatenated trellis coded modulation", Proceedings of ICC'96, Dallas, Tex., June 1996.

[4] Benedetto, Divsalar, Montorsi, Pollara, "Serial Concatenated Trellis Coded modulation with Iterative Decoding", ISIT97.

[5] Claude Berrou, Alain Glvieux, and Punya Thitimajshima, "Near Shannon Limit Error Correcting Coding and Decoding: turbo-codes", Proceedings of ICC'93, Geneva, Switzerland, May 1993.

[6] Claude Berrou, and Alain Glvieux, "Near Optimum Error Correcting Coding and Decoding: turbo-codes," IEEE Transaction on Communications, October 1996.

The following applications, filed concurrently herewith are hereby incorporated by reference:
1. A Hybrid Fiber Twisted-pair Local Loop Network Service Architecture (Gerszberg 41-3-13);
2. Dynamic Bandwidth Allocation for use in the Hybrid Fiber Twisted-pair Local Loop Network Service Architecture (Gerszberg 42-4-14);
3. The VideoPhone (Gerszberg 43-9-2);
4. VideoPhone Privacy Activator (Gerszberg 44-10-3);
5. VideoPhone Form Factor (Gerszberg 45-11-4);
6. VideoPhone Centrally Controlled User Interface With User Selectable Options (Gerszberg 46-12-5);
7. VideoPhone User Interface Having Multiple Menu Hierarchies (Gerszberg 47-13-6);
8. VideoPhone Blocker (Gerszberg 79-38-26);
9. VideoPhone Inter-com For Extension Phones (Gerszberg 48-14-7);
10. Advertising Screen Saver (53-17);
11. VideoPhone FlexiView Advertising (Gerszberg 49-15-8);
12. VideoPhone Multimedia Announcement Answering Machine (Gerszberg 73-32-20);
13. VideoPhone Multimedia Announcement Message Toolkit (Gerszberg 74-33-21);
14. VideoPhone Multimedia Video Message Reception (Gerszberg 75-34-22);
15. VideoPhone Multimedia Interactive Corporate Menu Answering Machine Announcement (Gerszberg 76-35-23);
16. VideoPhone Multimedia Interactive On-Hold Information Menus (Gerszberg 77-36-24);
17. VideoPhone Advertisement When Calling Video Non-enabled VideoPhone Users (Gerszberg 78-37-25);
18. Motion Detection Advertising (Gerszberg 54-18-10);
19. Interactive Commercials (Gerszberg 55-19);
20. VideoPhone Electronic Catalogue Service (Gerszberg 50-169);
21. A Facilities Management Platform For Hybrid Fiber Twisted-pair Local Loop Network, Service Architecture (Barzegar 18-56-17);
22. Multiple Service Access on Single Twisted-pair (Barzegar (16-51-15);
23. Life Line Support for Multiple Service Access on Single Twisted-pair (Barzegar 17-52-16);
24. A Network Server Platform (NSP) For a Hybrid Fiber Twisted-pair (HFTP) Local Loop Network Service Architecture (Gerszberg 574-2-24);
25. A Communication Server Apparatus For Interactive Commercial Service (Gerszberg 58-20-11);
26. NSP Multicast, PPV Server (Gerszberg 59-21-12);
27. NSP Internet, JAVA Server and VideoPhone Application Server (Gerszberg 60-5-3-22-18);
28. NSP WAN Interconnectivity Services for Corporate Telecommuters (Gerszberg 71-9-7-4-21-6);
29. NSP Telephone Directory White-Yellow Page Services (Gerszberg 614423-19);
30. NSP Integrated Billing System For NSP services and Telephone services (Gerszberg 62-7-5-24-20);
31. Network Server Platform/Facility Management Platform Caching Server (Gerszberg 63-8-6-3-5);
32. An Integrated Services Director (ISD) For HFTP Local Loop Network Service Architecture (Gerszberg 72-36-22-12);
33. ISD and VideoPhone Customer Premise Network (Gerszberg 64-25-34-13-5);
34. ISD Wireless Network (Gerszberg 65-26-35-14-6);
35. ISD Controlled Set-Top Box (Gerszberg 66-27-15-7);
36. Integrated Remote Control and Phone (Gerszberg 67-28-16-8);
37. Integrated Remote Control and Phone User Interface (Gerszberg 68-29-17-9);
38. Integrated Remote Control and Phone Form Factor (Gerszberg 69-30-18-10);
39. VideoPhone Mail Machine (Attorney Docket No. 3493.73170);
40. Restaurant Ordering Via VideoPhone (Attorney Docket No. 3493.73171);
41. Ticket Ordering Via VideoPhone (Attorney Docket No. 3493.73712);
42. Multi-Channel Parallel/Serial Concatenated Convolutional Codes And Trellis Coded Modulation Encode/Decoder (Gelblum 4-3);
43. Spread Spectrum Bit Allocation Algorithm (Shively 19-2);
44. Digital Channelizer With Arbitrary Output Frequency (Helms 5-3);
45. Method And Apparatus For Allocating Data Via Discrete Multiple Tones (filed Dec. 12, 1997, Attorney Docket No. 3493.20096—Sankaranarayanan 1-1);
46. Method And Apparatus For Reducing Near-End Cross Talk In Discrete Multi-Tone Modulators/Demodulators (filed Dec. 12, 1997, Attorney Docket No. 3493.37219—Helms 4-32-18).

I claim:

1. A method for transmitting turbo-encoded data in a multitone channel having multiple subchannels, comprising the steps of:

calculating a lowest signal-to-noise ratio corresponding to each of number of information bits to be transmitted in each of said subchannels;

storing a result of said step of calculating in a memory;

encoding a data stream to generate a stream of parity bits; and transmitting a portion of said parity bits responsively to said result of said step of calculating.

2. A method as in claim 1, wherein said step of calculating includes simulating an AWGN channel.

3. A method as in claim 1, wherein said step of calculating includes simulating a channel with at least one of Rayleigh fading and impulsive noise.

4. A method as in claim 1, further comprising calculating a number of parity bits corresponding to said lowest signal-to-noise ratio and said step of transmitting includes transmitting said portion responsively to said step of calculating a number of parity bits.

5. A method as in claim 1, further comprising calculating a number of parity bits corresponding to said lowest signal-to-noise ratio and said step of transmitting includes transmitting said portion responsively to said step of calculating a number of parity bits.

* * * * *